United States Patent
Mohammad et al.

(10) Patent No.: US 12,489,435 B2
(45) Date of Patent: Dec. 2, 2025

(54) STATE VECTOR PULSE WIDTH MODULATION SYSTEMS AND METHODS

(71) Applicant: Goodrich Corporation, Charlotte, NC (US)

(72) Inventors: Shoukath Ali Mohammad, Bangalore (IN); Vipul Kohli, Bangalore (IN); Ashish Vijay, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 2 days.

(21) Appl. No.: 18/742,398

(22) Filed: Jun. 13, 2024

(65) Prior Publication Data
US 2025/0330164 A1  Oct. 23, 2025

(30) Foreign Application Priority Data
Apr. 19, 2024 (IN) .............................. 202441031420

(51) Int. Cl.
*H03K 7/08* (2006.01)
*H02M 1/08* (2006.01)
*H02M 7/5395* (2006.01)

(52) U.S. Cl.
CPC ............... *H03K 7/08* (2013.01); *H02M 1/08* (2013.01); *H02M 7/5395* (2013.01)

(58) Field of Classification Search
None
See application file for complete search history.

(56) References Cited

U.S. PATENT DOCUMENTS

| | | | | |
|---|---|---|---|---|
| 7,868,603 | B2 * | 1/2011 | Lacombe | H02M 3/156 |
| | | | | 323/285 |
| 9,054,586 | B2 * | 6/2015 | Wei | H02M 7/217 |
| 9,244,473 | B2 * | 1/2016 | Young | H02M 3/1584 |
| 9,450,520 | B2 * | 9/2016 | Chi | H02N 2/008 |
| 11,189,439 | B2 * | 11/2021 | Yamakawa | H02M 7/12 |
| 11,909,299 | B2 * | 2/2024 | Yamakawa | H02M 1/327 |
| 2012/0169263 | A1 | 7/2012 | Gallegos-Lopez et al. | |
| 2014/0306638 | A1 | 10/2014 | Wu et al. | |
| 2017/0229977 | A1 | 8/2017 | Mondal | |

FOREIGN PATENT DOCUMENTS

| | | |
|---|---|---|
| CN | 103701382 | 1/2016 |
| CN | 105932925 | 9/2016 |
| IN | 201741042315 | 12/2017 |

* cited by examiner

*Primary Examiner* — Thomas J. Hiltunen
(74) *Attorney, Agent, or Firm* — SNELL & WILMER L.L.P.

(57) ABSTRACT

Systems, apparatus, and methods for computing a duty cycle for generating pulse width modulated signals to control switches of an inverter. A measured DC bus voltage is used to perform a search using a lookup table to generate an output value corresponding to the measured DC bus voltage. The output value is hard coded and is proportional to a value approximately inverse to the measured DC bus voltage, or a normalized value thereof. The output value can then be multiplied with one or more reference voltages (e.g., three reference voltages for three phase signals) to generate one or more duty cycles.

20 Claims, 5 Drawing Sheets

STATE VECTOR PULSE WIDTH MODULATION SYSTEMS AND METHODS

CROSS-REFERENCE TO RELATED APPLICATIONS

This application claims priority to, and the benefit of, India Provisional Patent Application No. 202441031420, filed Apr. 19, 2024 and titled "STATE VECTOR PULSE WIDTH MODULATION SYSTEMS AND METHODS," which is incorporated by reference herein in its entirety for all purposes.

FIELD

The present disclosure relates generally to power electronics and control, and more specifically, to pulse width modulation techniques

BACKGROUND

Space vector pulse width modulation (PWM) is a technique to control the generation and delivery of multi-phase (e.g., three phase) voltage output from a direct voltage (DC) power source. In three phase systems, the output signal can be, or can approximate, an alternating voltage and/or alternating current (AC) signal having three independent phases separated by one hundred twenty degrees. The three signals produced by such space vector PWM platforms can be used to drive the inductors or other components of a motor or other output load. The use of space vector PWM techniques has permitted the control of three phase voltage to motors and other loads using relatively flexible and inexpensive programmed electronic control modules. In space vector PWM platforms, a set of space vectors, encoded as three-bit values, can be used to drive or control a set of three phase switches whose switching action can produce voltage levels that approximate an alternating voltage output in the three component phases.

SUMMARY

In general, one aspect of the subject matter described in this disclosure may be embodied in a method of computing a duty cycle for generating pulse width modulated signals to control switches of an inverter. The method includes measuring a DC bus voltage to generate a measured DC bus voltage. The method further includes performing a search algorithm with a lookup table to generate an output value corresponding to a reciprocal of the measured DC bus voltage. The method further includes multiplying the output value with a first reference voltage to generate a first duty cycle.

In another aspect, a system is provided. The system can be for computing a duty cycle for generating pulse width modulated signals to control switches of an inverter. The system can include a processor and a tangible, non-transitory memory configured to communicate with the processor, the tangible, non-transitory memory having instructions stored thereon that, in response to execution by the processor, cause the processor to perform operations. The operations can include measuring, by the processor, a DC bus voltage to generate a measured DC bus voltage. The operations can further include performing a search algorithm with a lookup table to generate an output value corresponding to a reciprocal of the measured DC bus voltage. The operations can further include multiplying the output value with a first reference voltage to generate a first duty cycle.

These and other embodiments may optionally include one or more of the following features. The lookup table can include a plurality of output values that each correspond to a predetermined range of DC bus voltages, and the search algorithm selects the output value by determining which of the predetermined ranges of DC bus voltages includes the measured DC bus voltage. Each output value of the plurality of output values can be inversely proportional to a predetermined DC bus voltage that falls within the predetermined range of DC bus voltages corresponding to the measured DC bus voltage. Each output value of the plurality of output values in the lookup table can be normalized by a pulse width modulation maximum count value. The predetermine DC bus voltage can be at least one of a median value or an average value of the predetermined range of DC bus voltages.

The method/operations can further include multiplying the output value with a second reference voltage to generate a second duty cycle. The method/operations can further include multiplying the output value with a third reference voltage to generate a third duty cycle.

The method/operations can further include comparing the measured DC bus voltage with a start index of the lookup table and an end index of the lookup table to determine whether the measured DC bus voltage is within an acceptable range. The method/operations can further include, in response to the measured DC bus voltage being outside the acceptable range, generating a disable signal to indicate the measured DC bus voltage is outside the acceptable range.

In another aspect, a method of controlling a power inverter is provided. The method can include generating a set of pulse width modulation (PWM) signals for each of a plurality of space vectors, the set of pulse width modulation (PWM) signals comprising a set of three phase signals controlling a set of three phase switches connected across a DC power source. Generating the set of pulse width modulation (PWM) signals can include measuring a DC bus voltage to generate a measured DC bus voltage, performing a search algorithm with a lookup table to generate an output value corresponding to a reciprocal of the measured DC bus voltage, and multiplying the output value with a first reference voltage to generate a first duty cycle.

These and other embodiments may optionally include one or more of the following features. The performing the search algorithm with the lookup table can include determining which of a plurality of predetermined ranges of DC bus voltages of the lookup table includes the measured DC bus voltage, and selecting the output value of the lookup table that corresponds with the predetermined range of DC bus voltages that includes the measured DC bus voltage. The output value can be a hard-coded value that is divided by a predetermined DC bus voltage that falls within the predetermined range of DC bus voltages corresponding to the measured DC bus voltage. The hard-coded value of the output value can be normalized by a pulse width modulation maximum count value. The predetermine DC bus voltage can be at least one of a median value or an average value of the predetermined range of DC bus voltages.

The method can further include multiplying the output value with a second reference voltage to generate a second duty cycle. The method can further include multiplying the output value with a third reference voltage to generate a third duty cycle.

The method can further include comparing the measured DC bus voltage with a start index of the lookup table and an end index of the lookup table to determine whether the measured DC bus voltage is within an acceptable range, and, in response to the measured DC bus voltage being outside the acceptable range, generating a disable signal to indicate the measured DC bus voltage is outside the acceptable range.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
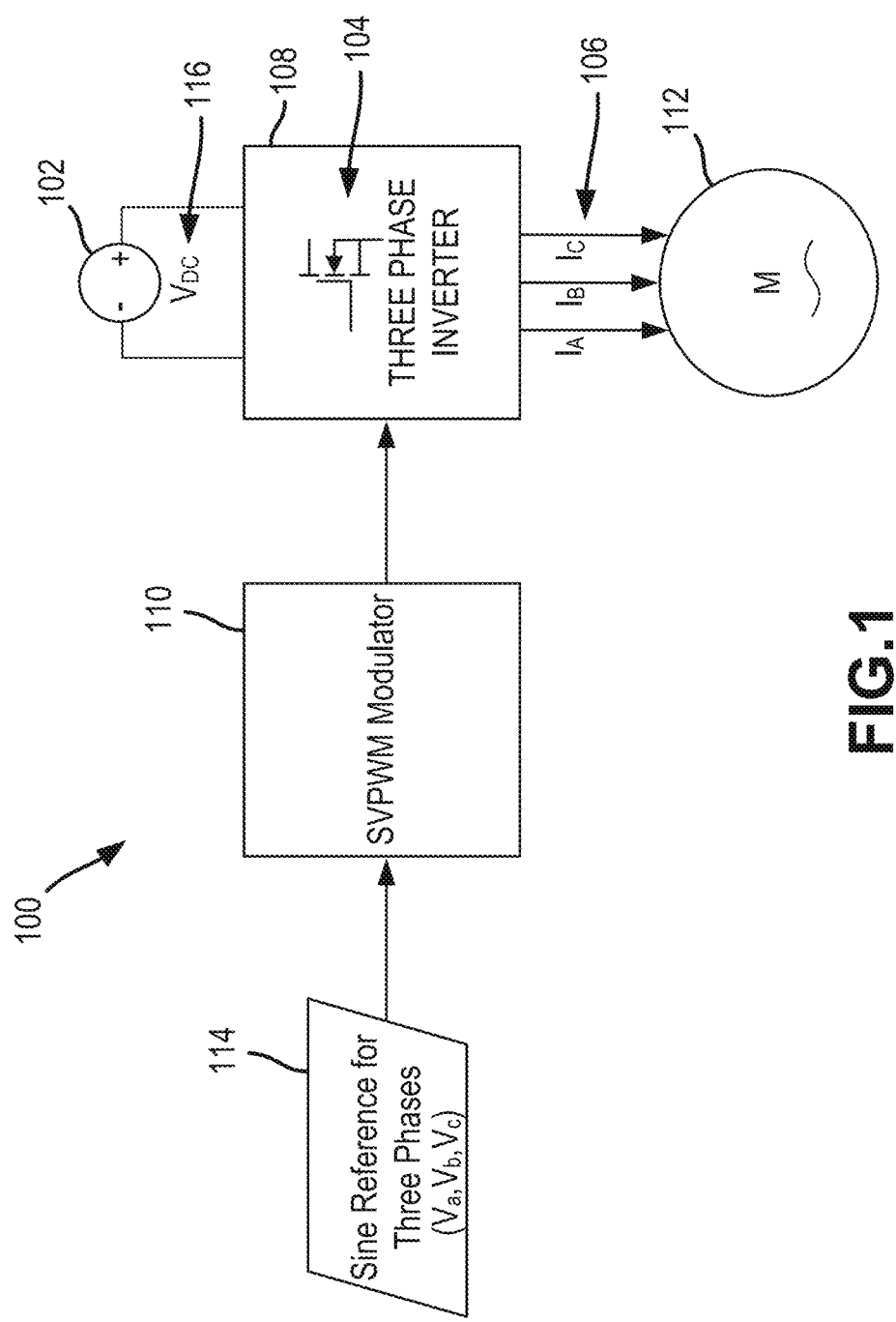
FIG. 1 schematically illustrates an example system in which systems and methods for space vector pulse width modulation switching can operate, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

When performing any computation on FPGAs, multipliers can be preferred over dividers due to multipliers low latency and low resource utilization. Systems, apparatus, and methods for computing a duty cycle for generating pulse width modulated signals to control switches of an inverter utilize multipliers and a lookup table instead. A search algorithm can include a hysteresis of ±10V to estimate the inverse of the DC bus voltage ($1/V_{DC}$) in the lookup table. Utilizing a lookup table in this manner can slightly sacrifice accuracy (e.g., effects the accuracy of computation pipeline in 4th decimal) in exchange for reduced latency and resource utilization. This is particularly beneficial for resource constrained and/or timing sensitive PMS motor control designs.

FIG. 1 illustrates an example system 100 in which systems and methods for space vector pulse width modulation switching can operate, according to various aspects. In aspects as shown, a power inverter module 108 hosted in the system 100 can contain, include, and/or interface to a direct voltage and/or direct current (DC) power supply 102, send voltage from that power supply through a set of phase switches 104, and generate a set of three-phase voltage outputs 106 to send to a load 112. In various aspects, the direct voltage and/or direct current (DC) power supply 102 can be or include a power supply which generates direct voltage from a rectified alternating voltage and/or alternating current (AC) source, a battery-based direct voltage, and/or direct current (DC) power supply, and/or other types of direct voltage and/or direct current (DC) power supplies or sources.

In various aspects, the direct voltage and/or direct current (DC) power supply 102 can be coupled to the set of phase switches 104, which can be coupled to a controller 110 (also referred to herein as a state vector PWM modulator). The set of phase switches 104 in implementations can include a set of six switches. In various aspects, the set of phase switches 104 can comprise a set of transistors, such as a set of three insulated gate bipolar transistors (IGBTs), a set of three field effect transistors (FETs), and/or other types of transistors, configured to operate for instance in a switching mode. In various aspects, the set of phase switches 104 can be or include discrete transistors, and/or can be incorporated in an integrated circuit (IC). Other types of switches, including those not constituting or based on transistors, can be used. Pairs of the six switches can be configured to switch the voltage signal for one of three voltage output signals that are arranged to be one hundred twenty degrees apart in phase. In various aspects, the switch for each phase can be configured to only allow the switch to close on the upper or lower side, to avoid shorting the switch. In various aspects, the power inverter module 108 is a three-phase inverter. While three pairs of switches in the set of phase switches 104 are discussed, it will be appreciated that other numbers, types, and/or configurations of switches can be used.

According to various aspects, the controller 110 includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. According to various aspects, the controller 110 comprises a FPGA. In various embodiments, the controller 110 controls, at least various parts of, and operation of various components of, the system 100. For example, the controller 110 controls the power inverter module 108.

According to various aspects, the controller 110, which can be or include a programmable logic device such as a FPGA, can manipulate the set of phase switches 104 to open and close the upper and lower switches for each switch line (A, B, and C). By opening and closing the set of phase switches 104 in switching sequence or pattern, the controller 110 can generate and/or transmit the set of three-phase voltage outputs to the load 112. According to aspects, the load 112 can be any of a variety of electrical loads, such as an electric motor. An electric motor used in the load 112 can be or include of an alternating (AC) induction motor, brushless direct (DC) motor, a switched reluctance motor, a permanent magnet synchronous motor, and/or other types of motors.

According to aspects, the switching sequence or pattern generated or applied by the controller 110 can be a state vector pulse width modulation (PWM)-based sequence, in which triplets of one or zero values in the form (0,0,0), (1,0,0) and so forth can be used to encode or represent the ON or OFF state of a pulse width modulation signal that constitutes or generates the set of three-phase outputs 106, which in turn drives the load 112. The controller 110 can receive a sine reference 114 for each phase (e.g., three phases for a three-phase load 112) for which the controller 110 is calculating a duty cycle. The sine reference 114 can be an analog voltage signal. In this regard, the controller 110 can receive three analog signals (Va, Vb, Vc). Moreover, the controller 110 can measure the DC bus voltage ($V_{DC}$) 116—i.e., the voltage measured across the direct current (DC) power supply 102—for computing the duty cycle(s) as discussed in greater detail with respect to FIG. 2 and FIG. 3. In various implementations, the state vector PWM scheme used by the system 100 can utilize a lookup table (LUT) which reduces the number data flip flops (DFF) used for calculating duty cycle(s) (i.e., low resource utilization) and further reduces latency of the calculations. Reducing the number of calculations for computing duty cycle, and particularly reducing the number of division calculations that the controller 110 performs, can result in improved energy efficiency and improved latency. Other benefits can be realized.

Figure 2:
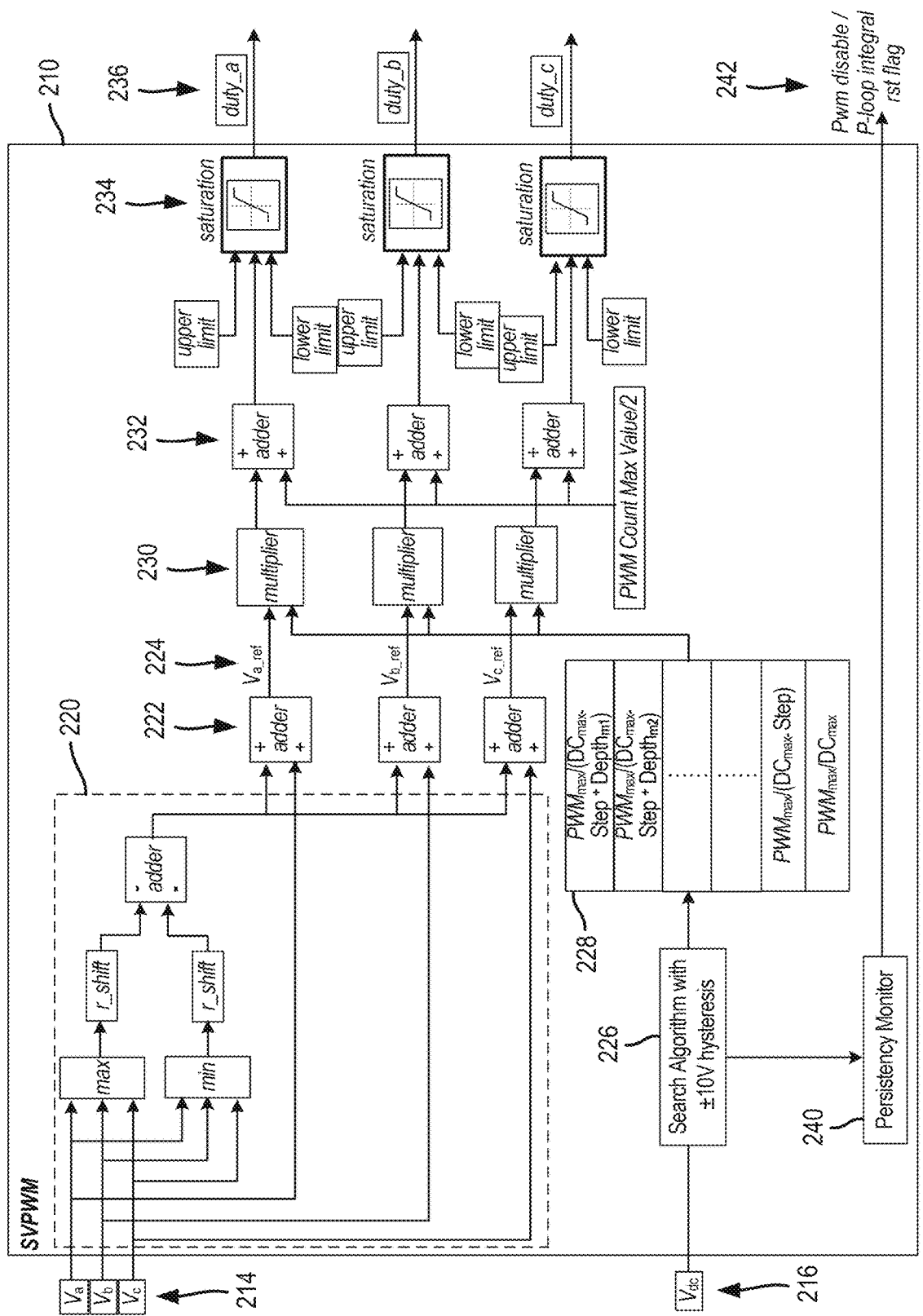
FIG. 2 schematically illustrates a control logic for space vector pulse width modulation, in accordance with various embodiments.

FIG. 2 is a schematic diagram of an example controller 210 programmed for state vector pulse width modulation. In various aspects, controller 210 is similar to controller 110 of FIG. 1. In various embodiments, aspects of controller 210 are implemented using a FPGA. Controller 210 can receive a sine reference 214 for each phase (e.g., three phases for a three-phase load 112) for which the controller 210 is calculating a duty cycle. The sine reference 214 can be an analog voltage signal. The sine reference 214 can be include a first voltage signal $V_a$, a second voltage signal $V_b$, and a third voltage signal $V_c$, referred to generally as sine reference(s) 214. The sine reference(s) 214 can include analog voltage signals. The sine reference(s) 214 can be fixed point voltages. The controller 210 can include a zero-sequence voltage calculator 220 which calculates a zero-sequence component for each of the sine references 214 (i.e., the first voltage signal $V_a$, the second voltage signal $V_b$, and the third voltage signal $V_c$). The zero-sequence components can be added to the sine references 214 with summing blocks 222 to generate reference voltages 224 for each phase (e.g., a first reference voltage $V_{a\_ref}$, a second reference voltage $V_{b\_ref}$, and a third reference voltage $V_{c\_ref}$).

In various aspects, the controller 210 measures and/or receives a DC bus voltage 216. In various aspects, the DC bus voltage 216 is similar to the DC bus voltage 116 of FIG. 1. The controller 210 can implement and/or perform a search algorithm 226 using a lookup table 228 to generate an output value corresponding to the reciprocal of the measured DC bus voltage 216. The output value need not be exactly proportional to the multiplicative inverse of the measured DC bus voltage 216. However, the output value of the lookup table 228 can be within a predetermined range, such as within a fraction of a percent, of the multiplicative inverse of the measured DC bus voltage 216. Moreover, the output value can be equal to the estimated multiplicative inverse of the measured DC bus voltage 216 normalized by the pulse width modulation maximum count value, as discussed herein. The lookup table 228 can include a plurality of output values that each correspond to a predetermined range of DC bus voltages. The output values are precalculated by taking an inverse of the measured DC bus voltage 216 (or a DC bus voltage similar thereto, such as within 10V of the measured DC bus voltage 216 for example). In this manner, the controller 210 has no need to perform a dividing function, which can be computationally expensive and resource intensive. Stated differently, instead of having a divider, the multiplier 230 is used to multiply the reference voltage 224 by the inverse of the DC bus voltage (or a voltage within a predetermined range thereof). Using the multiplier 230 (as opposed to a divider) decreases latency and resource utilization of the controller 210. The search algorithm 226 can select the output value by determining which of the predetermined ranges of DC bus voltages includes the measured DC bus voltage 216. The output values can be pre-divided by a predetermined DC bus voltage that falls within the predetermined range of DC bus voltages corresponding to the measured DC bus voltage 216.

In various embodiments, each output value of the lookup table 228 is normalized by a pulse width modulation maximum count value ($PWM_{max}$). In this manner, there is no need for a separate multiplier function (e.g., similar to multiplier 230) to normalize the duty cycle output of the controller 210 by the maximum count value, further decreasing latency and resource utilization of the controller 210.

Figure 3:
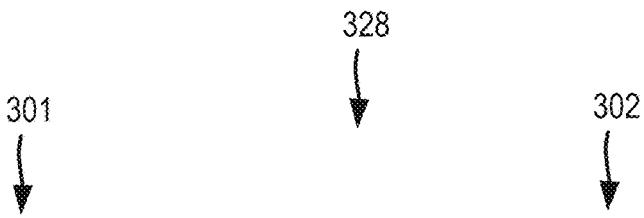
FIG. 3 illustrates an example lookup table stored in a memory for used by a control logic for space vector pulse width modulation, in accordance with various embodiments.

With momentary reference to FIG. 3, an example lookup table 328 is illustrated which includes a plurality of indices 301 and a plurality of output values 302. The lookup table 328 can be similar to the lookup table 228 of FIG. 2, in accordance with various embodiments. Each index 301 is a predetermined range of DC bus voltages. In various embodiments, the range of DC bus voltages can be 10V for each predetermined range. Stated differently, the difference between the second voltage ($V_{DC\_2}$) and the first voltage ($V_{DC\_min}$) can be 10 volts. However, this range can vary as desired. For example, the range of DC bus voltages can be 5V for each predetermined range, 8V, 12V, 15V or any other desired range. An output value 302 is associated with each index 301. For example, with combined reference to FIG. 2 and FIG. 3, when the measured DC bus voltage 216 is between a first voltage ($V_{DC\_min}$) and a second voltage $V_{DC\_2}$), the search algorithm 226 can output an output value equal to the inverse of a predetermined DC bus voltage, including normalization such as $PWM_{max}/V_{DC}$ in accordance with various embodiments. In the illustrated example of FIG. 3, the predetermined DC bus voltage can be an average of the first and second voltages ($V_{DC\_min}$ and $V_{DC\_2}$). For example, when the first voltage ($V_{DC\_min}$) is 500V and the second voltage ($V_{DC\_2}$) is 510V, the output value can be (1/505V) in various embodiments, or the output value can be ($PWM_{max}/505V$) in various embodiments. The predetermined DC bus voltage can be selected to be an average voltage of the associated range, a median voltage of the associated range, or the like.

In various embodiments, the output value is normalized by a fixed pulse width modulation maximum count value ($PWM_{max}$). This further decreases the number of operations performed on the reference voltage(s) for computing the duty cycle(s) since the normalization calculation is hard coded into the lookup table and thereby decreases latency and memory usage by the FPGA.

With reference to FIG. 2, the controller 210 can multiply the output value of the lookup table 228 with each reference voltage at the multiplier blocks 230. For example, the controller 210 can multiply the output value of the lookup table 228 with a first reference voltage (Va_ref) for calculating a first duty cycle (duty_a), with a second reference voltage (Vb_ref) for calculating a second duty cycle (duty_b), and with a third reference voltage (Vc_ref) for calculating a third duty cycle (duty_c). The output of each multiplier block 230 can be added to half the pulse width modulation maximum count value ($PWM_{max}/2$) with summing blocks 232 to convert the bipolar signals (i.e., the output of each multiplier block 230) to unipolar signals. The unipolar output signals can then undergo saturation at saturation blocks 234. The saturation blocks 234 can normalize the signals so prevent overmodulation. The saturation blocks 234 output the duty cycles 236 (e.g., a first duty cycle, duty_a, a second duty cycle, duty_b, and a third duty cycle, duty_c) which can be further used by inverter switches (e.g., the phase switches 104 of FIG. 1) to generate a three-phase variable voltage variable frequency waveform for connection to a motor (e.g., the load 112).

In various embodiments, the controller 210 further includes an out-of-range persistency monitor 240. The persistency monitor 240 can compare the measured DC bus voltage 216 with a start index (e.g., see $V_{DC\_min}$ of FIG. 3) of the lookup table 228 and an end index (e.g., see $V_{DC\_max}$ of FIG. 3) of the lookup table 228 to determine whether the measured DC bus voltage 216 is within an acceptable range. In response to the measured DC bus voltage 216 being outside the acceptable range, the persistency monitor 240 can generate a disable signal 242 to indicate the measured DC bus voltage 216 is outside the acceptable range. The disable signal 242 can be used to disable the PWM and/or reset the integral saturators of preceding PI (proportional-integral) loops in case the available DC bus voltage is too low or too high.

Table 1 shows how the disclosed state vector PWM system reduces both resources and latency for an FPGA environment. For example, the baseline SVPWN is similar to the SVPWM shown in FIG. 2, but without the search algorithm 226, the lookup table 228, or the persistency monitor 240. Instead, the example baseline SVPWM uses (more computationally expensive) dividers in place of the multipliers 230 and further includes multipliers at the output of the saturation blocks 234 to normalize the duty cycle output by the max count value. Further, the baseline SVPWM adds 0.5 at adders 232 as opposed to PWM Count Max Value/2.

TABLE 1

RESOURCE UTILIZATION

| Resource | 4LUT | DFF | Latency | 40 MHz clock cycles |
| --- | --- | --- | --- | --- |
| Baseline SVPWM | 2461 | 1483 | 1.675 us | 67 |
| Proposed SVPWM | 1932 | 985 | 0.475 us | 19 |

In Table 2 it is shown how the computed duty cycles from the disclosed SVPWM compares to the baseline SVPWM. The below table shows three scenarios for max PWM duty count of 1334 (15 KHz period, computed at 40 MHz system clock). The SVPWM without LUT can be similar to the baseline SVPWM. The first scenario is when the measured Vdc 540V matches with 1/540 of the lookup table. Here it can be noticed that the duty calculation is equivalent in both methods. In the second scenario the measured Vdc 535V is slightly different for the output value of 1/540 of the lookup table. In this second scenario, it can be seen that computed duty cycle difference is about 0.30%. In the third scenario, the measured Vdc 530V is between 1/520 and 1/540 of the lookup table. It can be seen that the computed duty cycle difference is about 0.65% which is also the worst possible duty difference for a search algorithm that includes a hysteresis of ±10V.

TABLE 2

COMPUTATION ACCURACY

| | SVPWM without LUT | | | Proposed SVPWM | | |
| --- | --- | --- | --- | --- | --- | --- |
| Measured Vdc | Duty A count | Duty B count | Duty C count | Duty A count | Duty B count | Duty C count |
| 540 V | 1105 (82.8334%) | 228 (17.0915%) | 870 (65.2174%) | 1105 (82.8334%) | 228 (17.0915%) | 870 (65.2174%) |
| 535 V | 1109 (83.1333%) | 224 (16.7916%) | 872 (65.3673%) | 1105 (82.8334%) | 228 (17.0915%) | 870 (65.2174%) |
| 530 V | 1113 (83.4333%) | 220 (16.4917%) | 874 (65.5172%) | 1122 (84.1079%) | 211 (15.8171%) | 878 (65.8171%) |

Figure 4:
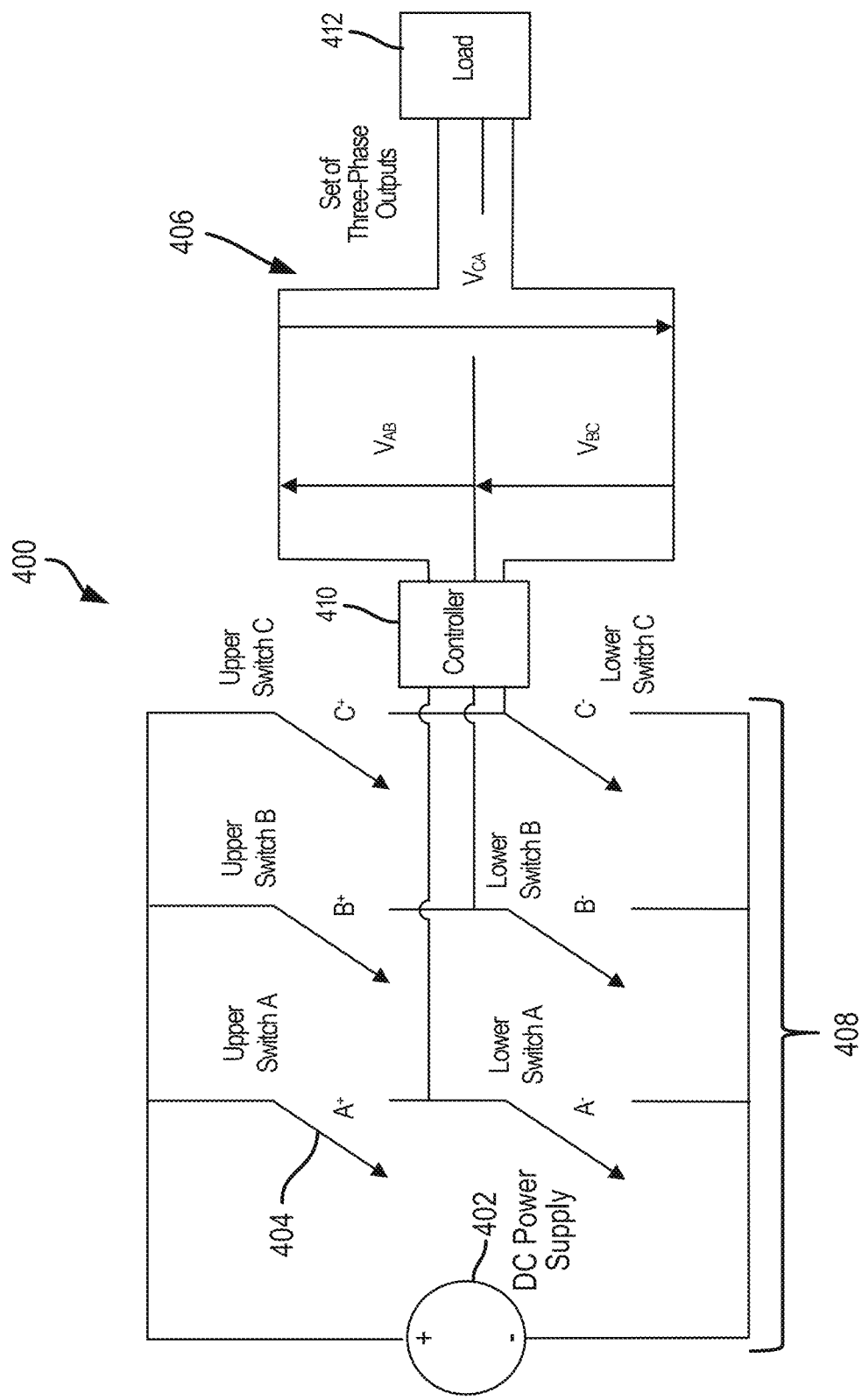
FIG. 4 schematically illustrates an example system in which systems and methods for space vector pulse width modulation switching can operate, in accordance with various embodiments.

FIG. 4 illustrates an example system 400 in which systems and methods for space vector pulse width modulation switching can operate, according to various aspects. In aspects, a power inverter module 408 hosted in the system 100 can contain, include, and/or interface to a direct voltage and/or direct current (DC) power supply 402, send voltage from that power supply through a set of phase switches 404, and generate a set of three-phase voltage outputs 406 to send to a load 412. The system 400 can further includes a controller 410 for controlling the power inverter module 108. In aspects, the direct voltage and/or direct current (DC)

power supply 402 can be similar to the DC power supply 102 of FIG. 1. In aspects, the power inverter module 408 can be similar to the power inverter module 108 of FIG. 1. In aspects, the controller 410 can be similar to the controller 110 of FIG. 1.

Figure 5B:
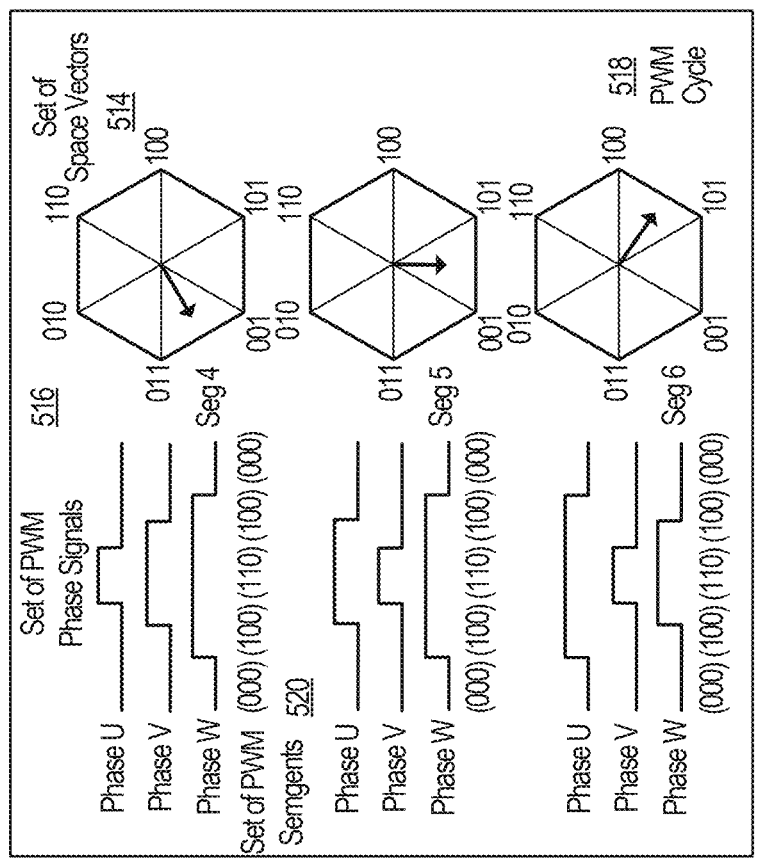
FIG. 5A and FIG. 5B illustrate a set of PWM phase signal that can be used across a set of PWM segments in a PWM cycle of a space vector PWM system, in accordance with various embodiments.
Figure 5A:
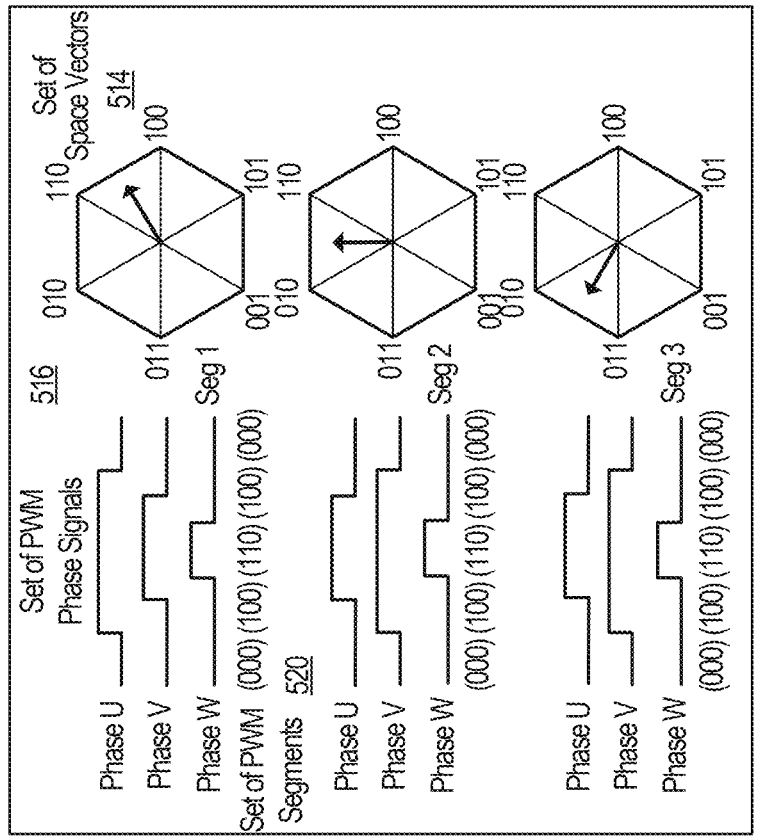

For the instance illustrated in FIG. 5A and FIG. 5B, the set of phase switches 404 can be driven by a set of PWM phase signals 516 in a PWM cycle 518. In various embodiments, the overall PWM cycle 518 can comprise a set of PWM segments 520. As shown, the set of PWM segments 520 can include a set of six PWM segments, corresponding to the upper and lower cycles of each of the three power phases. The values of the set of PWM phase signals 116 in each segment can correspond to a rotating space vector (counterclockwise, (1,0,0) to (1,0,1)), along with two null vectors, (0,0,0) and (1,1,1). In aspects as shown, within each PWM segment, the set of PWM phase signals 516 can consist of U, V, and W signals in either a zero (low) or one (high) state. The combined zero (low) and one (high) states can correspond to the digits of the space vector representations of each of the three phases, and indicate the alternating voltage and/or alternating current (AC) output to be generated by the controller 410. In implementations as shown, each PWM segment 520 can be configured to comprise five clock periods or cycles. In aspects, the set of PWM phase signals 116 can assume different states or values in each of the five clock periods or cycles. It should be understood that more or fewer clock periods or cycles can be used without departing from the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of computing a duty cycle for generating pulse width modulated signals to control switches of an inverter, the method comprising:
measuring a DC bus voltage to generate a measured DC bus voltage;
performing a search algorithm with a lookup table to generate an output value corresponding to a reciprocal of the measured DC bus voltage; and
multiplying the output value with a first reference voltage to generate a first duty cycle.

2. The method of claim 1, wherein the lookup table includes a plurality of output values that each correspond to a predetermined range of DC bus voltages, and the search algorithm selects the output value by determining which of the predetermined ranges of DC bus voltages includes the measured DC bus voltage.

3. The method of claim 2, wherein each output value of the plurality of output values is divided by a predetermined DC bus voltage that falls within the predetermined range of DC bus voltages corresponding to the measured DC bus voltage.

4. The method of claim 3, wherein each output value of the plurality of output values in the lookup table is normalized by a pulse width modulation maximum count value.

5. The method of claim 3, wherein the predetermined DC bus voltage is at least one of a median value or an average value of the predetermined range of DC bus voltages.

6. The method of claim 1, further comprising:
multiplying the output value with a second reference voltage to generate a second duty cycle; and
multiplying the output value with a third reference voltage to generate a third duty cycle.

7. The method of claim 1, further comprising:
comparing the measured DC bus voltage with a start index of the lookup table and an end index of the lookup table to determine whether the measured DC bus voltage is within an acceptable range; and
in response to the measured DC bus voltage being outside the acceptable range, generating a disable signal to indicate the measured DC bus voltage is outside the acceptable range.

8. A system for computing a duty cycle for generating pulse width modulated signals to control switches of an inverter, the system comprising:
a processor; and
a tangible, non-transitory memory configured to communicate with the processor, the tangible, non-transitory memory having instructions stored thereon that, in response to execution by the processor, cause the processor to perform operations comprising:
measuring, by the processor, a DC bus voltage to generate a measured DC bus voltage;
performing a search algorithm with a lookup table to generate an output value corresponding to a reciprocal of the measured DC bus voltage; and
multiplying the output value with a first reference voltage to generate a first duty cycle.

9. The system of claim 8, wherein the lookup table includes a plurality of output values that each correspond to a predetermined range of DC bus voltages, and the search algorithm selects the output value by determining which of the predetermined ranges of DC bus voltages includes the measured DC bus voltage.

10. The system of claim 9, wherein each output value of the plurality of output values is divided by a predetermined DC bus voltage that falls within the predetermined range of DC bus voltages corresponding to the measured DC bus voltage.

11. The system of claim 10, wherein each output value of the plurality of output values in the lookup table is normalized by a pulse width modulation maximum count value.

12. The system of claim 10, wherein the predetermine DC bus voltage is at least one of a median value or an average value of the predetermined range of DC bus voltages.

13. The system of claim 8, wherein the instructions cause the processor to perform further operations comprising:
multiplying the output value with a second reference voltage to generate a second duty cycle; and
multiplying the output value with a third reference voltage to generate a third duty cycle.

14. The system of claim 8, wherein the instructions cause the processor to perform further operations comprising:
comparing the measured DC bus voltage with a start index of the lookup table and an end index of the lookup table to determine whether the measured DC bus voltage is within an acceptable range; and
in response to the measured DC bus voltage being outside the acceptable range, generating a disable signal to indicate the measured DC bus voltage is outside the acceptable range.

15. A method of controlling a power inverter, comprising:
generating a set of pulse width modulation (PWM) signals for each of a plurality of space vectors, the set of pulse width modulation (PWM) signals comprising a set of three phase signals controlling a set of three phase switches connected across a DC power source;
wherein the generating the set of pulse width modulation (PWM) signals comprises:
measuring a DC bus voltage to generate a measured DC bus voltage;
performing a search algorithm with a lookup table to generate an output value corresponding to a reciprocal of the measured DC bus voltage; and
multiplying the output value with a first reference voltage to generate a first duty cycle.

16. The method of claim 15, wherein the performing the search algorithm with the lookup table includes:
determining which of a plurality of predetermined ranges of DC bus voltages of the lookup table includes the measured DC bus voltage; and
selecting the output value of the lookup table that corresponds with the predetermined range of DC bus voltages that includes the measured DC bus voltage, wherein the output value is a hard-coded value that is divided by a predetermined DC bus voltage that falls within the predetermined range of DC bus voltages corresponding to the measured DC bus voltage.

17. The method of claim 16, wherein the hard-coded value of the output value is normalized by a pulse width modulation maximum count value.

18. The method of claim 16, wherein the predetermine DC bus voltage is at least one of a median value or an average value of the predetermined range of DC bus voltages.

19. The method of claim 15, further comprising:
multiplying the output value with a second reference voltage to generate a second duty cycle; and
multiplying the output value with a third reference voltage to generate a third duty cycle.

20. The method of claim 15, further comprising:
comparing the measured DC bus voltage with a start index of the lookup table and an end index of the lookup table to determine whether the measured DC bus voltage is within an acceptable range; and
in response to the measured DC bus voltage being outside the acceptable range, generating a disable signal to indicate the measured DC bus voltage is outside the acceptable range.

* * * * *